United States Patent
Kaneda et al.

(10) Patent No.: US 7,880,592 B2
(45) Date of Patent: Feb. 1, 2011

(54) ARRIVAL ALERTING DEVICE, ARRIVAL ALERTING METHOD, AND MOBILE TERMINAL

(75) Inventors: Shoichi Kaneda, Tokyo (JP); Kenji Ueno, Tokyo (JP); Minoru Ueda, Tokyo (JP)

(73) Assignee: Namiki Seimitsu Houseki Kabushiki Kaisha (JP)

( * ) Notice: Subject to any disclaimer, the term of this patent is extended or adjusted under 35 U.S.C. 154(b) by 309 days.

(21) Appl. No.: 10/296,758

(22) PCT Filed: Mar. 26, 2002

(86) PCT No.: PCT/JP02/02935

§ 371 (c)(1),
(2), (4) Date: May 21, 2003

(87) PCT Pub. No.: WO02/080498

PCT Pub. Date: Oct. 10, 2002

(65) Prior Publication Data

US 2004/0204149 A1    Oct. 14, 2004

(30) Foreign Application Priority Data

Mar. 29, 2001    (JP) ............................... 2001-95702

(51) Int. Cl.
*G08B 3/00*    (2006.01)

(52) U.S. Cl. .............. 340/388.1; 340/384.1; 340/388.6; 455/567

(58) Field of Classification Search ................ 455/567, 455/575.1, 550.1, 569.1, 90.1–90.3, 349, 455/550, 388; 84/610, 611, 622; 340/391.1, 340/384.1, 384.73, 311.1, 825.46, 407.1, 340/388, 388.1, 388.6; 381/71.1, 71.2, 71.7, 381/190, 191, 124, 172; 362/86

See application file for complete search history.

(56) References Cited

U.S. PATENT DOCUMENTS

| | | | | |
|---|---|---|---|---|
| RE32,980 E | * | 7/1989 | Hirano et al. | 84/610 |
| 5,076,260 A | * | 12/1991 | Komatsu | 601/59 |
| 5,157,596 A | * | 10/1992 | Alcone | 700/55 |
| 5,524,061 A | * | 6/1996 | Mooney et al. | 381/151 |
| 5,894,263 A | * | 4/1999 | Shimakawa et al. | 340/388.1 |
| 6,259,935 B1 | * | 7/2001 | Saiki et al. | 455/567 |
| 6,574,489 B1 | * | 6/2003 | Uriya | 455/567 |
| 2003/0162071 A1 | * | 8/2003 | Yasuda | 429/34 |

FOREIGN PATENT DOCUMENTS

| | | | |
|---|---|---|---|
| EP | 0 970 759 | * | 1/2000 |
| EP | 1 222 971 | * | 7/2002 |
| JP | 10-272417 | * | 10/1998 |
| JP | 2000-325879 A | | 11/2000 |
| JP | 2000325879 A | * | 11/2000 |
| JP | 2001-121079 A | | 5/2001 |

* cited by examiner

*Primary Examiner*—Nay A Maung
*Assistant Examiner*—Richard Chan
(74) *Attorney, Agent, or Firm*—Studebaker & Brackett PC; Donald R. Studebaker

(57) ABSTRACT

This invention realizes an incoming call notification operation for portable equipments in which the amplitude of vibration matches the rhythm of the melody, by electrically connecting an electromagnetic induction actuator that produces melody and vibration to an integrated circuit that outputs the melody generation signal and the vibration signal, and by applying to the electromagnetic induction actuator either the melody generation signal from the integrated circuit or a signal created by mixing the melody generation signal and the vibration generation signal.

15 Claims, 5 Drawing Sheets

ARRIVAL ALERTING DEVICE, ARRIVAL ALERTING METHOD, AND MOBILE TERMINAL

FIELD OF TECHNOLOGY

This invention concerns incoming call notification equipment, methods of incoming call notifications, and a portable equipment in which the incoming call notification equipment is mounted.

PRIOR TECHNOLOGY

Mobile equipments of recent years, as represented by portable telephones, have become increasingly multi-functional in accordance with the demands and tastes of users. A particularly popular function is that of incoming call notification by means of a vibrator or a melody, not a ring tone, when the user's call signal is received. It is possible to switch the volume of the ring or melody up or down by stages, and to activate the melody or vibration at fixed intervals.

Past portable equipments have had mounted in them, as a method of incoming call notification, a small, cylindrical motor 22 [as published] with an eccentric weight as a means of generating vibration, as shown in FIG. 5 [as published]; a transducer as a means to generate a ring tone or melody; a speaker to generate the voice signal; and a signal generation source that is an integrated circuit that outputs two signals—a signal that generates a ring tone or melody in the transducer (hereafter the "melody generation signal") and a signal that generates the vibration in the small, cylindrical motor 20 (hereafter the "vibration signal").

The integrated circuit is a single unit that generates, through separate terminals, the melody generation signals (a) and (b) having a number of patterns of waveform, amplitude and frequency as shown in FIG. 6 [as published] and the vibration signal (c). By electrically connecting the transducer and small, cylindrical motor 20 to these terminals, either the melody or ring tone from the transducer or the vibration from the small vibrating motor 20 is activated. The portable terminals in which these are mounted are therefore able to perform incoming call notification by means of melody, ring tone or vibration.

Because portable equipments have been given multiple functions, as stated above, and in order to distinguish one type from others, it has become desirable to provide an incoming call notification that controls the amplitude of the vibration in rhythm with the melody. Control of the vibration amplitude of the motor with an eccentric weight shown in FIG. 5 is generally accomplished by one of two methods, the method of varying the intensity of the vibration amplitude itself by varying the voltage of the signal impressed on the vibrator, and the method of varying the length of drive time to the vibrator.

However, the small vibrating motor 22 with an eccentric weight that is shown in FIG. 5 is normally driven by a fixed voltage, and is not well-suited to variation of the voltage value of the impressed signal. It has been necessary, therefore, to control the amplitude of vibration by changing the cycle time length of the vibration signal shown in FIG. 4(c), and not by varying the voltage value of the signal impressed on the small vibrating motor.

Given this situation, the inventors observed the incoming call notification operation of portable equipments in which the transducers, the small, cylindrical motors and the integrated circuits were actually mounted, and confirmed that the small, cylindrical motors were just driven intermittently with a fixed amplitude of vibration, not in relation to the rhythm of the melody. That is, in the constitution of the conventional incoming call notification method, it is not possible to achieve an incoming call notification operation that controls the amplitude of the vibration in time with the rhythm of the melody.

It was also surmised that the characteristics of the small, cylindrical motor described above make it difficult to control the vibration in time with the rhythm. Characteristics of the small, cylindrical motor's rate of rotation in response to signals is shown in FIG. 6. As shown in FIG. 6, the small, cylindrical motor 22 requires several seconds (2 to 3 seconds) to reach the desired rotation rate after the vibration signal is impressed on the internal coil. Consequently, even if the amplitude of vibration is controlled by instantaneously changing the rotation rate to match the rhythm of the melody, the instantaneous response is poor, and the task is not possible. Further, starting current of the small, cylindrical motor is great, and so an attempt to drive the motor with instantaneous changes of the rotation rate would greatly increase the power consumed. Another of the problems of the increased current is increased wear on the brushes and commutator contacts within the motor, reducing the service life of the contacts.

DESCRIPTION OF INVENTION

In order to solve the problems described above and obtain the desired incoming call notification operation, this invention provides incoming call notification equipment that has a signal generation source with a melody generation signal output terminal and a vibration signal output terminal, and that has an electromagnetic induction actuator that is electrically connected to the melody generation signal output terminal and produces melody and vibration.

Further, it provides an incoming call notification method for a portable equipment that has a signal generation source with a melody generation signal output terminal and a vibration signal output terminal and a means of producing melody or vibration in response to their signals, in which method an electromagnetic induction actuator that is electrically connected to the melody generation signal output terminal is used as the means of producing melody or vibration.

Moreover, it provides another mode of incoming call notification equipment that has a signal generation source that has a mixed signal output terminal for which the melody generation signal is mixed with a vibration signal that varies at least one of the signal voltage, frequency or period of impression, and that has an electromagnetic induction actuator that is electrically connected to the mixed signal output terminal and produces melody and vibration.

Further, it provides another mode of incoming call notification method for a portable equipment that has a signal generation source that has a mixed signal output terminal for which the melody generation signal is mixed with a vibration signal that varies at least one of the signal voltage, frequency or period of impression, in which method an electromagnetic induction actuator that is electrically connected to the melody generation signal output terminal and produces melody and vibration is used as the means of producing melody or vibration.

Further, it provides a portable equipment that has one of the modes of incoming call notification equipment described above.

OPTIMUM MODE OF IMPLEMENTATION OF THE INVENTION

Figure 1:
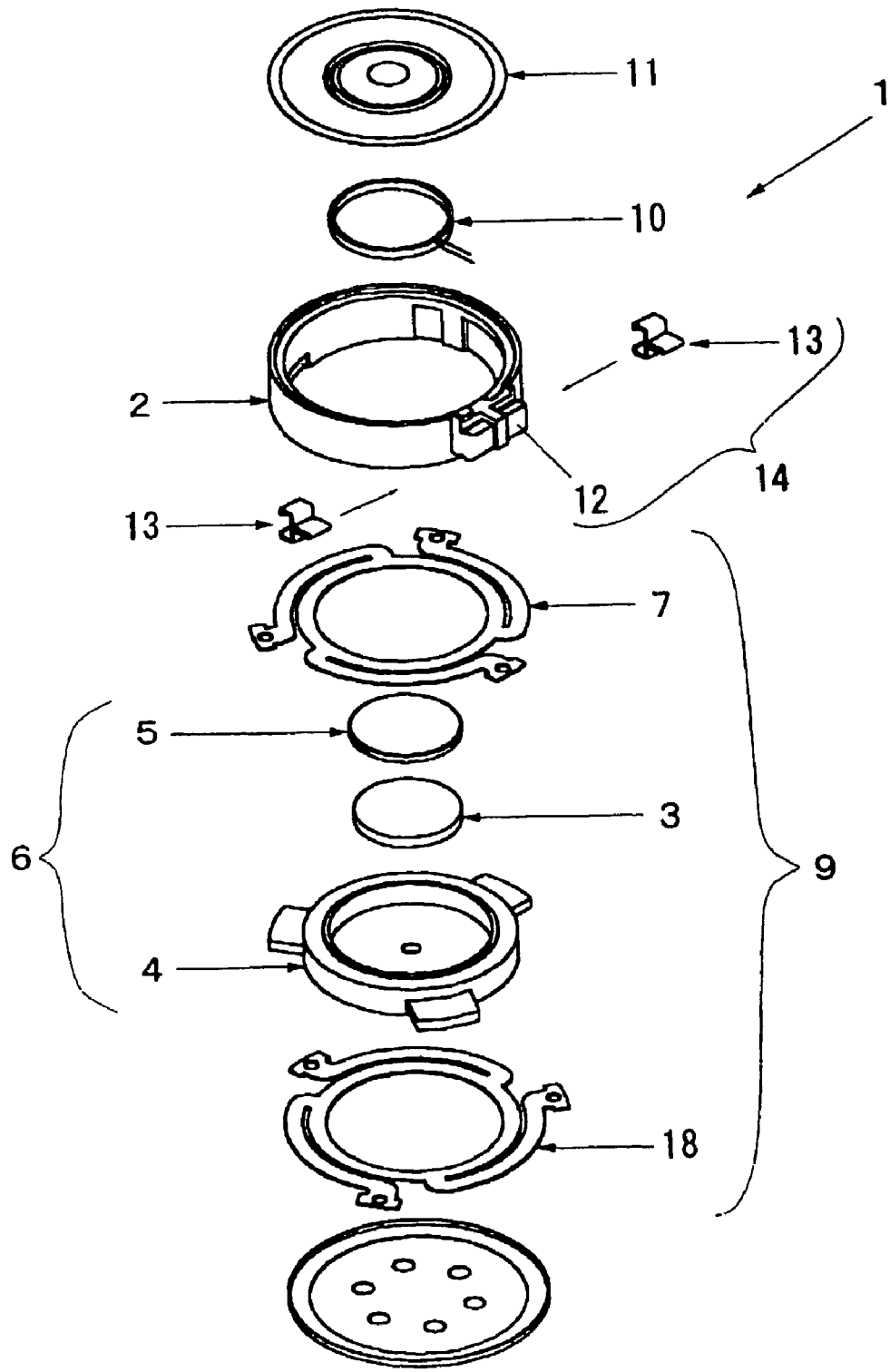
FIG. 1 is an oblique schematic view showing the constitution of the electromagnetic induction actuator.

First Example of Implementation: The first example of implementation of this invention is explained below with reference to the drawings. FIG. 1 is an oblique schematic view showing the constitution of the electromagnetic induction actuator that is used as melody and vibration generator of this invention. The electromagnetic induction actuator 1 has a cylindrical housing 2 with a magnet 3, a yoke 4 and a pole piece 5 making up a magnetic circuit 6 that is flexibly supported by suspension springs 7, 8 to make up a mechanical vibration system 9, and a diaphragm 11 to which is attached a voice coil 10 is fitted and fixed into the open end of the housing 2. On the side wall of the housing 2 is a terminal block 12 that projects outward; terminal fittings 13 are located on the terminal block 12 to form the input terminals 14. The voice coil 10 is electrically connected to the terminal fittings 13.

By appropriately varying the frequency of the electric signals applied to the voice coil 10, it is possible to selectively vibrate the mechanical vibration system 9 and the diaphragm 11, and thus produce vibration, a buzzer and audio tones with a single actuator. Concretely, the mechanical vibration system 9 vibrates with resonant oscillation in the range of 120 Hz to 150 Hz; at higher frequencies a buzzer and audio tones are produced by the diaphragm 11.

Figure 2:
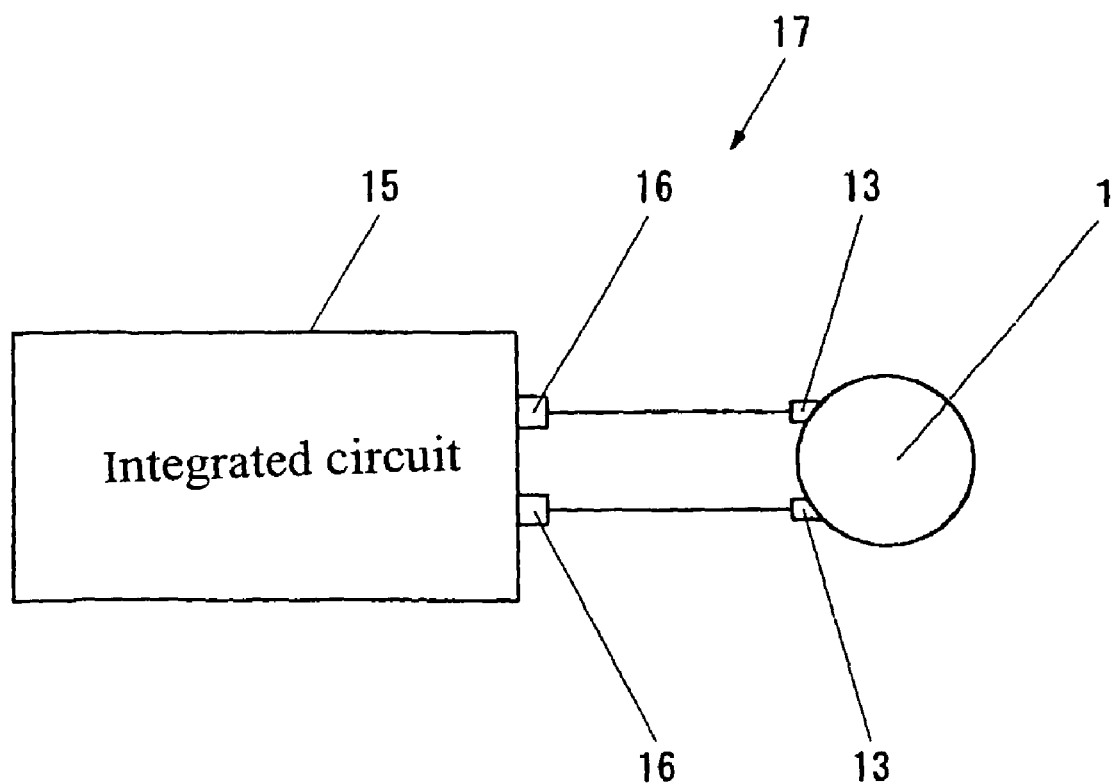
FIG. 2 is a schematic drawing of the incoming call notification equipment of this invention.
Figure 3:
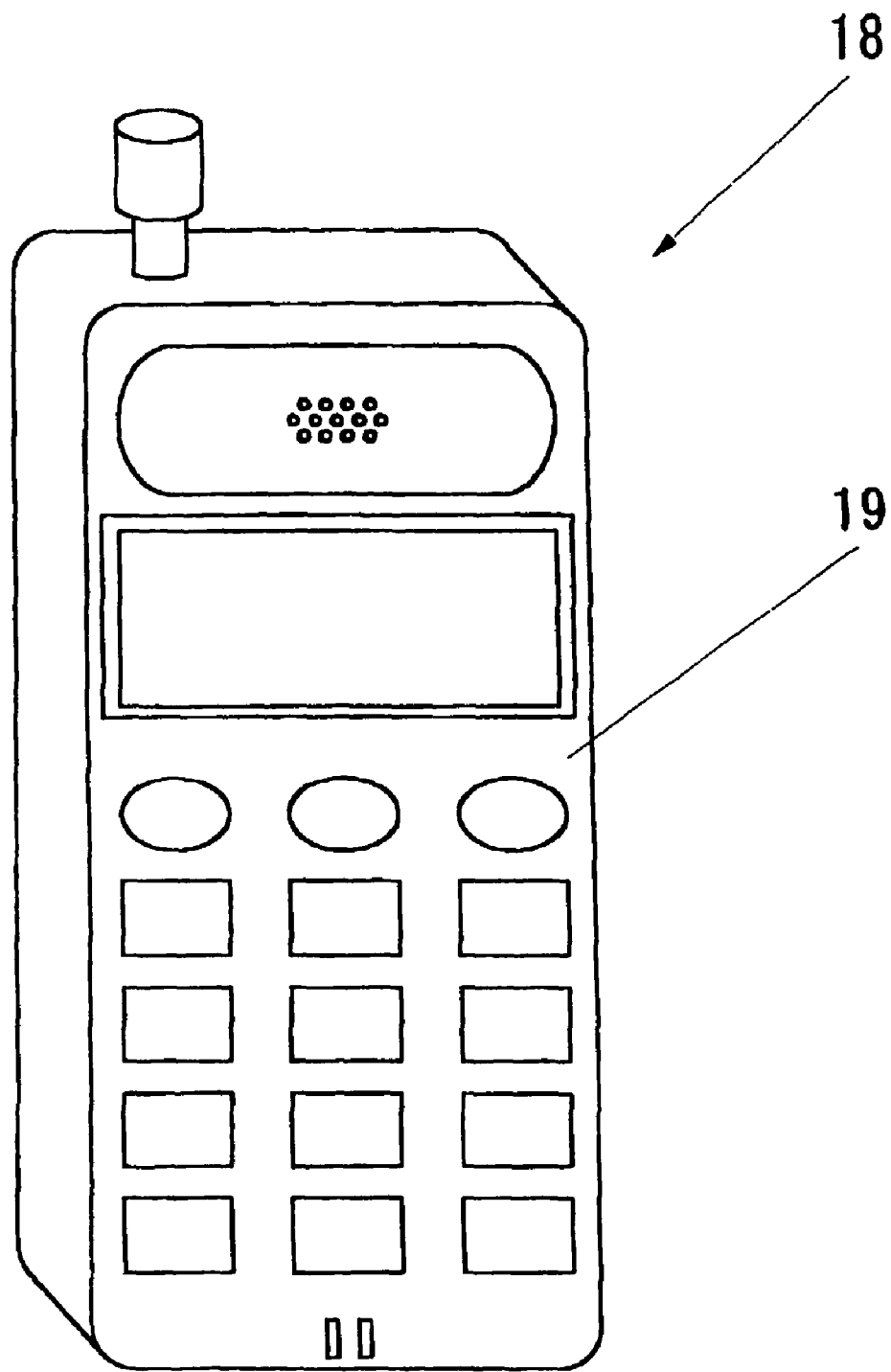
FIG. 3 is an external view of the portable equipment in which the incoming call notification equipment of FIG. 2 is mounted.

Next, the incoming call notification method using the electromagnetic induction actuator 1 described, along with the incoming call notification equipment implementing that method, will be explained with reference to the drawings. FIG. 2 is a schematic drawing of the incoming call notification equipment of this mode of implementation of the invention, and FIG. 3 is an external view of the portable equipment in which the incoming call notification equipment of FIG. 2 is mounted. As shown in FIG. 2, the terminal fittings 13 of the electromagnet induction actuator 1 are electrically connected to the output terminals 16 for the melody generation signal of the integrated circuit 15; this constitutes the incoming call notification equipment 17. Melody generation signals as shown in FIG. 4(a) and (b) are output from the output terminals 16.

The frequency region of the melody generation signal is most often set in the range from 20 Hz to 20 kHz, which is the ordinary definition of the range audible to humans. The rhythm of the melody is determined by the time sequence of changing between the various frequencies within this frequency region.

That is, when the melody generation signal in the range of approximately 120 Hz to 150 Hz is input to the electromagnetic induction actuator 1 in accordance with the rhythm of the melody, the mechanical vibration system 9 resonates and the maximum vibration amplitude is produced by the electromagnetic induction actuator 1. As stated above, the frequency of the melody generation signal varies in a time sequence that matches the rhythm, and so when the frequency range is a little outside the range of approximately 120 Hz to 150 Hz, the vibration amplitude produced by the actuator 1 is somewhat weaker. The further the frequency range is from approximately 120 Hz to 150 Hz, the weaker the vibration amplitude will be.

As the rhythm changes and the frequency approaches the range of approximately 120 Hz to 150 Hz, however, the vibration amplitude increases, and the maximum vibration amplitude is produced in the range of approximately 120 Hz to 150 Hz. As described above, the vibration amplitude is controlled in time with the rhythm of the melody.

The inventors mounted an incoming call notification equipment 17, as described above, in the portable equipment 18 shown in FIG. 3, and when they observed the incoming call notification operation by manual contact with the external case 19, they were able to ascertain that the vibration amplitude was controlled in time with the rhythm of the melody.

In the example of implementation described above, the electromagnetic induction actuator that produces the melody and vibration is connected to the melody generation signal output terminals of the integrated circuit, and the amplitude of vibration produced by the actuator is controlled by changes in the frequency of the melody generation signal, and so it is quite easy to realize an incoming call notification equipment in which the vibration amplitude is controlled to match the rhythm of the melody, as well as the incoming call notification method and a portable equipment in which the incoming call notification equipment is mounted.

Second Example of Implementation: Next, the incoming call notification method of the second example of implementation of this invention, the incoming call notification equipment in which that method is concretely implemented and the portable equipment in which the incoming call notification equipment is mounted are explained below with reference to the drawings. Now, for those points which are the same as in the first example of implementation, the same symbols are used and the explanation is omitted.

As in FIG. 2, in this example of implementation the terminal fittings 13 of the electromagnetic induction actuator 1 are electrically connected to the melody generation signal output terminals 16 of the integrated circuit 15, thus constituting the incoming call notification equipment 17. Accordingly, the melody generation signal is output from the integrated circuit 15 to the electromagnetic induction actuator 1.

In this example of implementation, a vibration signal is provided to the electromagnetic induction actuator in addition to the melody generation signal, by which means it is possible to achieve an incoming call notification operation that more rhythmically controls the vibration amplitude in time with the rhythm of the melody. The vibration signal is explained first.

Figure 4:
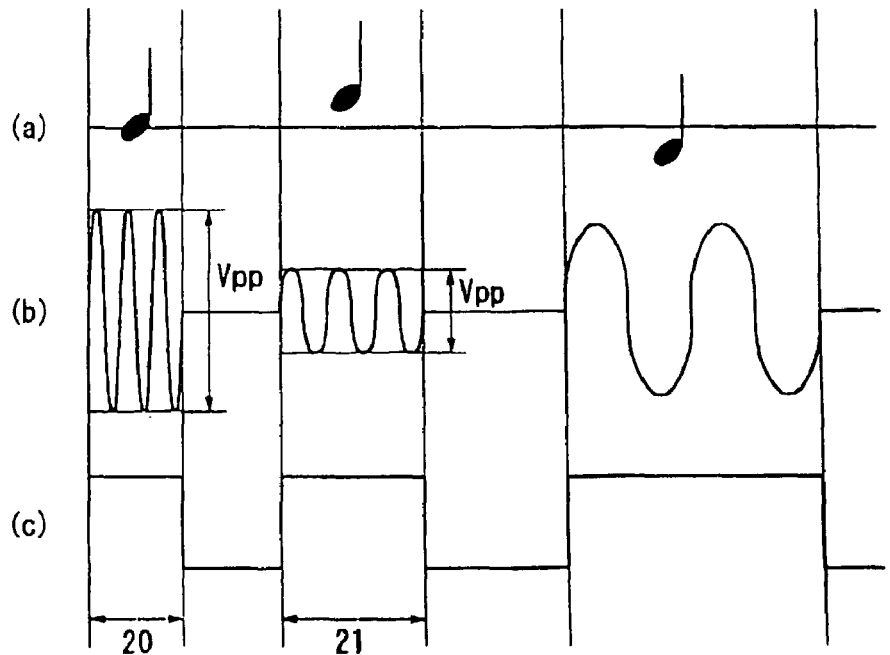
FIG. 4 is a schematic view showing the waveform of the vibration signal, the ON-OFF periods of the vibration signal, and the melody notation.
Figure 5:
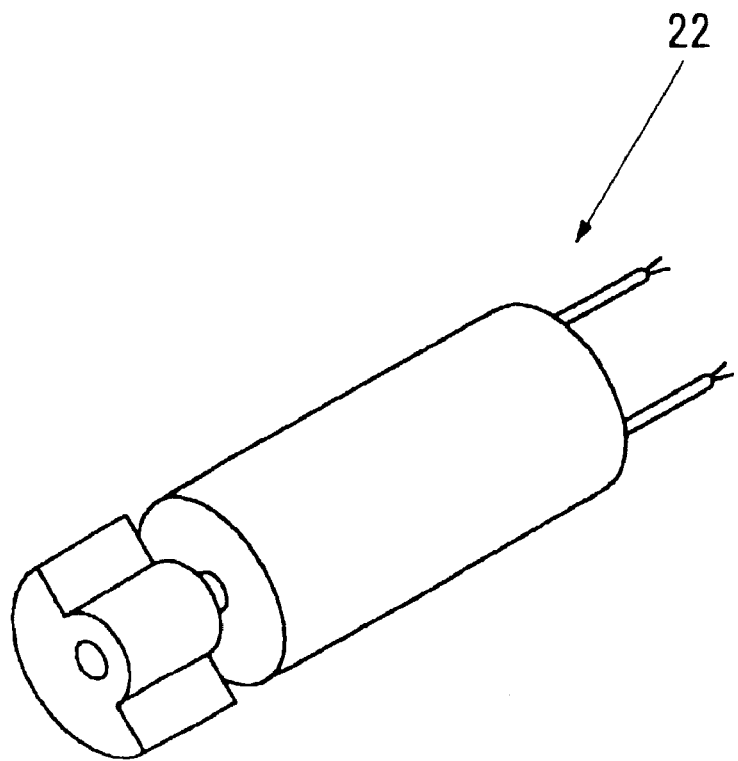
FIG. 5 is an oblique schematic view of the small, cylindrical motor which is a conventional vibrator.
Figure 6:
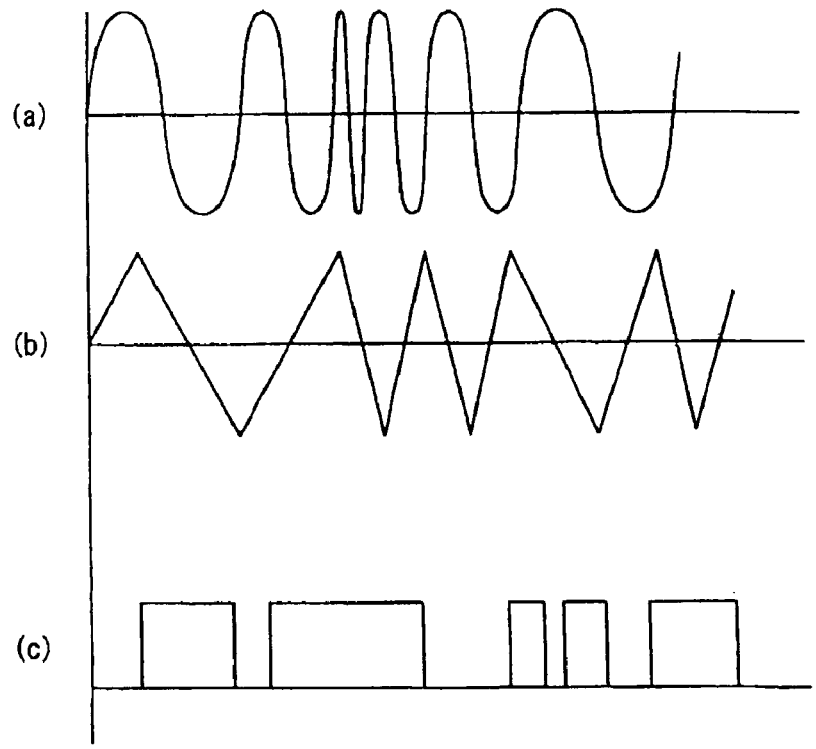
FIG. 6 is a waveform diagram showing examples of the melody generation signal and the vibration signal produced by the integrated circuit.
Figure 7:
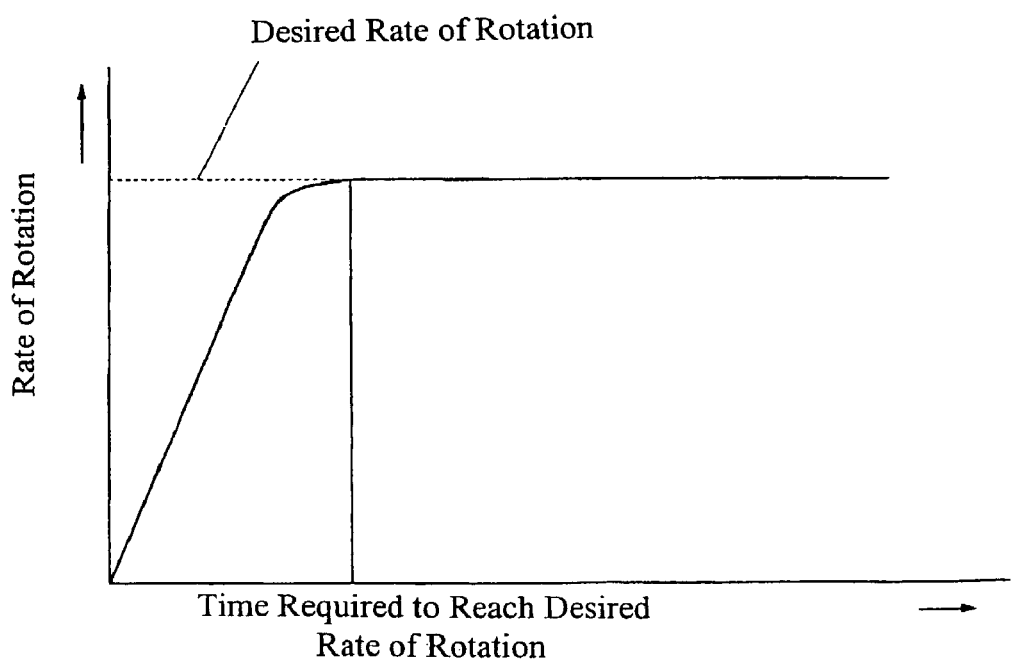
FIG. 7 is a graph showing the response characteristics of the small, cylindrical motor of FIG. 5.

FIG. 4 is a schematic view showing the waveform of the vibration signal (b), pulse waveforms indicating the length of the ON-OFF periods of the vibration signal (c), and the notation of the melody generated by the melody generation signal (a), all against a time axis.

As shown in (b) and (c) of the figure, one or more of the frequency of the vibration signal, the time it is impressed, and the voltage of the signal can be varied in accordance with the notes of the melody. In (a) of the figure, when the note of the melody is "do" during a time period 20, the frequency of the vibration signal is set to correspond to the note "do." When, with the passage of time, the note of the melody is "mi" during a time period 21, the frequency of the vibration signal is changed to correspond to the note "mi." By repeating this operation, the vibration amplitude of the electromagnetic induction actuator can be made stronger or weaker in accordance with the note of the melody.

Now, the range of frequency variation of the vibration signal is set in accordance with the resonant frequency range of the mechanical vibration system of the electromagnetic induction actuator. Consequently, in this example of implementation the frequency of the vibration signal is varied within the range of approximately 120 Hz to 150 Hz.

Moreover, the duration of each note sometimes varies, depending on the rhythm of the melody. In such cases, the period during which the vibration signal is impressed (ON) is also changed in accordance with the length of each note (expressed by periods 20, 21 in FIG. 4). The state of the change of the period of impression is shown by (c) in that figure. By controlling the period of impression as described above, the vibration produced by the electromagnetic induction actuator 1 is made to correspond to the rhythm of the melody.

Further, the intensity of each note is sometimes an element in the rhythm of the melody. In such cases, the voltage Vpp of the vibration signal is changed in accordance with the intensity of each note. The state of change in the voltage value is shown in (b) of FIG. 4. By controlling the voltage as described above, the vibration amplitude produced by the electromagnetic induction actuator 1 is made to correspond to the rhythm of the melody.

By simultaneously varying one or more of the voltage, period of impression and frequency of the vibration signal in accordance with the melody as explained above, it is possible to obtain an incoming call notification operation in which the changes of vibration amplitude are intensified and more rhythmical than that of the first example of implementation.

The operation in which the vibration signal is output by the electromagnetic induction actuator 1 is explained next. In FIG. 2, the vibration signal is mixed with the melody generation signal within the integrated circuit. This mixed signal is output from the output terminals 16 of the integrated circuit 15 to the electromagnetic induction actuator 1 and the incoming call notification operation occurs.

The inventors mounted the incoming call notification equipment 17 that operates as described above in a portable terminal 18 shown in FIG. 3, and observed the incoming call notification operation by means of manual contact with the exterior case 19. In doing so, they confirmed that in the incoming call notification operation, the changes of vibration amplitude are intensified and more rhythmical than in the first example of implementation.

In the example of implementation explained above, mixing the vibration signal with the melody generation signal and impressing the mixed signal to the electromagnetic induction actuator 1 makes it possible to obtain an incoming call notification operation in which the changes of vibration amplitude are intensified and more rhythmical.

POTENTIAL FOR INDUSTRIAL USE

As stated above, using this invention, the electromagnetic induction actuator is connected to the integrated circuit, and so it is possible to realize very easily an incoming call notification equipment with an incoming call notification operation in which control of the vibration amplitude is matched to the rhythm of the melody, as well as an incoming call notification method and a portable equipment in which that incoming call notification equipment is mounted.

Moreover, using this invention, the vibration signal can be mixed with the melody generation signal and impressed on the electromagnetic induction actuator, so that it is possible to realize an incoming call notification equipment with an incoming call notification operation in which changes of the vibration amplitude are intensified and more musical, as well as an incoming call notification method and a portable equipment in which that incoming call notification equipment is mounted.

Further, this invention uses an electromagnetic induction actuator as the means to produce the melody and the vibration, and so it is possible to control the amplitude of vibration with one or several of three parameters: the voltage, the period of impression and the frequency. It is possible, therefore, to control the amplitude of vibration with more precision and complexity than in the past.

The invention claimed is:

1. Incoming call notification equipment comprising:
    a signal generation source having a mixed signal output terminal for which a melody generation signal is mixed with a vibration signal that varies at least one of a signal voltage, frequency and period of impression;
    an electromagnetic induction actuator electrically connected to the mixed signal output terminal which produces melody and vibration, without a feedback signal provided to the output terminal of the signal generation source, the electromagnetic induction actuator having a mechanical vibration system and a diaphragm;
    a magnetic circuit including a magnet, a yoke, and a pole piece, with the mechanical vibration system including the magnetic circuit that is flexibly supported by a suspension spring; and
    a voice coil attached to the diaphragm,
    wherein the diaphragm is vibrated by the melody generation signal, and the melody is produced by vibration of the diaphragm, and at least one of the signal voltage, frequency and period of impression of the vibration signal is varied in accordance with a note of the melody of the melody generation signal, and
    wherein the range of frequency variation of the vibration signal is set in accordance with a resonant frequency range of the mechanical vibration system of the electromagnetic induction actuator.

2. Incoming call notification equipment comprising:
    a signal generation source having a mixed signal output terminal for which a melody generation signal is mixed with a vibration signal that varies at least one of a signal voltage, frequency and period of impression;
    an electromagnetic induction actuator electrically connected to the mixed signal output terminal which produces melody and vibration, without a feedback signal provided to the output terminal of the signal generation source, the electromagnetic induction actuator having a mechanical vibration system and a diaphragm;
    a magnetic circuit including a magnet, a yoke, and a pole piece, with the mechanical vibration system including the magnetic circuit that is flexibly supported by a suspension spring; and
    a voice coil attached to the diaphragm,
    wherein the diaphragm is vibrated by the melody generation signal, and the melody is produced by vibration of the diaphragm,
    and the period of impression is changed in accordance with a length of each note of the melody, wherein the range of frequency variation of the vibration signal is set in accordance with a resonant frequency range of the mechanical vibration system of the electromagnetic induction actuator.

3. Incoming call notification equipment comprising:
a signal generation source having a mixed signal output terminal for which a melody generation signal is mixed with a vibration signal that varies at least one of a signal voltage, frequency and period of impression;
an electromagnetic induction actuator electrically connected to the mixed signal output terminal which produces melody and vibration, without a feedback signal provided to the output terminal of the signal generation source, the electromagnetic induction actuator having a mechanical vibration system and a diaphragm;
a magnetic circuit including a magnet, a yoke, and a pole piece, with the mechanical vibration system including the magnetic circuit that is flexibly supported by a suspension spring; and
a voice coil attached to the diaphragm,
wherein the diaphragm is vibrated by the melody generation signal, and the melody is produced by vibration of the diaphragm,
and the signal voltage is changed in accordance with an intensity of the each note of the melody,
wherein the range of frequency variation of the vibration signal is set in accordance with a resonant frequency range of the mechanical vibration system of the electromagnetic induction actuator.

4. The incoming call notification equipment of claim 1, wherein the melody generation signal is mixed with the vibration signal that is varied by at least one of the signal voltage, the frequency or the period of impression is output to the electromagnetic induction actuator, so that the vibration amplitude of the mechanical system is controlled in accordance with the melody that is generated by vibration of the diaphragm.

5. An incoming call notification method for portable equipment having a signal generation source having a mixed signal output terminal for which a melody generation signal is mixed with a vibration signal that varies at least one of a signal voltage, frequency and period of impression, an electromagnetic induction actuator electrically connected to the melody generation signal output terminal producing melody and vibration, without a feedback signal provided to the output terminal of the signal generation source, the electromagnetic induction actuator having a mechanical vibration system and a diaphragm, a magnetic circuit including a magnet, a yoke, and a pole piece, the mechanical vibration system including the magnetic circuit that is flexibly supported by a suspension spring, and a voice coil attached to the diaphragm, said method comprising the steps of:
vibrating the diaphragm by the melody generation signal such that the melody is produced by vibration of the diaphragm, without providing a feedback signal to the output terminal of the signal generation source; and
varying at least one of the signal voltage, frequency or period of impression of the vibration signal in accordance with a note of the melody of the melody generation signal,
wherein the range of frequency variation of the vibration signal is set in accordance with resonant frequency range of the mechanical vibration system of the electromagnetic induction actuator.

6. An incoming call notification method for portable equipment having a signal generation source having a mixed signal output terminal for which a melody generation signal is mixed with a vibration signal that varies at least one of a signal voltage, frequency and period of impression,
an electromagnetic induction actuator electrically connected to the melody generation signal output terminal producing melody and vibration, without a feedback signal provided to the output terminal of the signal generation source, the electromagnetic induction actuator having a mechanical vibration system and a diaphragm,
a magnetic circuit including a magnet, a yoke, and a pole piece, the mechanical vibration system including the magnetic circuit that is flexibly supported by a suspension spring, and
a voice coil attached to the diaphragm, said method comprising the step of:
vibrating the diaphragm by the melody generation signal such that the melody is produced by vibration of the diaphragm, without providing a feedback signal to the output terminal of the signal generation source; and
the period of impression is changed in accordance with a length of each note of the melody,
wherein the range of frequency variation of the vibration signal is set in accordance with resonant frequency range of the mechanical vibration system of the electromagnetic induction actuator.

7. An incoming call notification method for portable equipment having a signal generation source having a mixed signal output terminal for which a melody generation signal is mixed with a vibration signal that varies at least one of a signal voltage, frequency and period of impression,
an electromagnetic induction actuator electrically connected to the melody generation signal output terminal producing melody and vibration, without a feedback signal provided to the output terminal of the signal generation source, the electromagnetic induction actuator having a mechanical vibration system and a diaphragm,
a magnetic circuit including a magnet, a yoke, and a pole piece, the mechanical vibration system including the magnetic circuit that is flexibly supported by a suspension spring, and
a voice coil attached to the diaphragm, said method comprising the step of:
vibrating the diaphragm by the melody generation signal such that the melody is produced by vibration of the diaphragm, without providing a feedback signal to the output terminal of the signal generation source; and
the signal voltage is changed in accordance with an intensity of the each note of the melody,
wherein the range of frequency variation of the vibration signal is set in accordance with resonant frequency range of the mechanical vibration system of the electromagnetic induction actuator.

8. The method of claim 5, wherein the melody generation signal is mixed with the vibration signal that is varied by at least one of the signal voltage, the frequency or the period of impression is output to the electromagnetic induction actuator, so that the vibration amplitude of the mechanical system is controlled in accordance with the melody that is generated by vibration of the diaphragm.

9. A portable terminal having incoming call notification equipment as described in claim 1.

10. The incoming call notification equipment of claims 2, wherein the melody generation signal is mixed with the vibration signal that is varied by at least one of the signal voltage, the frequency or the period of impression is output to the electromagnetic induction actuator, so that the vibration amplitude of the mechanical system is controlled in accordance with the melody that is generated by vibration of the diaphragm.

11. The incoming call notification equipment of claims 3, wherein the melody generation signal is mixed with the vibration signal that is varied by at least one of the signal voltage, the frequency or the period of impression is output to the electromagnetic induction actuator, so that the vibration amplitude of the mechanical system is controlled in accordance with the melody that is generated by vibration of the diaphragm.

12. The method of claim 6, wherein the melody generation signal is mixed with the vibration signal that is varied by at least one of the signal voltage, the frequency or the period of impression is output to the electromagnetic induction actuator, so that the vibration amplitude of the mechanical system is controlled in accordance with the melody that is generated by vibration of the diaphragm.

13. The method of claim 7, wherein the melody generation signal is mixed with the vibration signal that is varied by at least one of the signal voltage, the frequency or the period of impression is output to the electromagnetic induction actuator, so that the vibration amplitude of the mechanical system is controlled in accordance with the melody that is generated by vibration of the diaphragm.

14. A portable terminal having incoming call notification equipment as described in claim 2.

15. A portable terminal having incoming call notification equipment as described in claim 3.

* * * * *